A. RAMÉN.
MECHANICAL FURNACE.
APPLICATION FILED MAY 1, 1918.
1,353,268.
Patented Sept. 21, 1920.
2 SHEETS—SHEET 1.
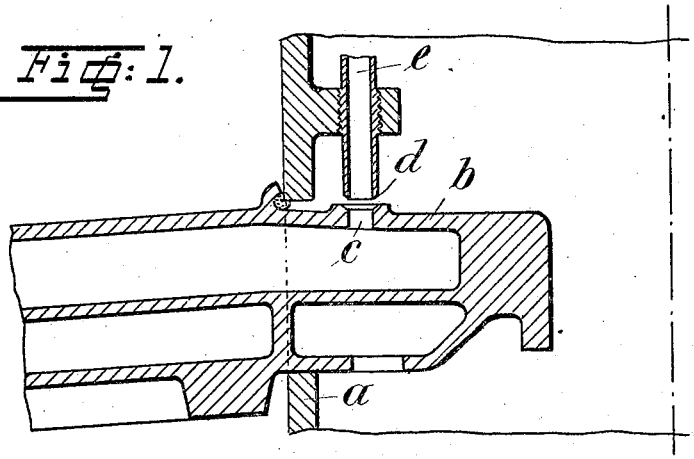
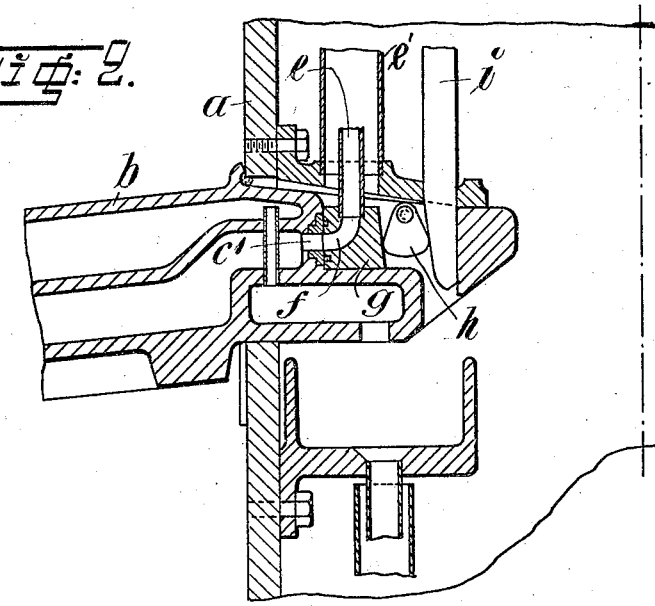

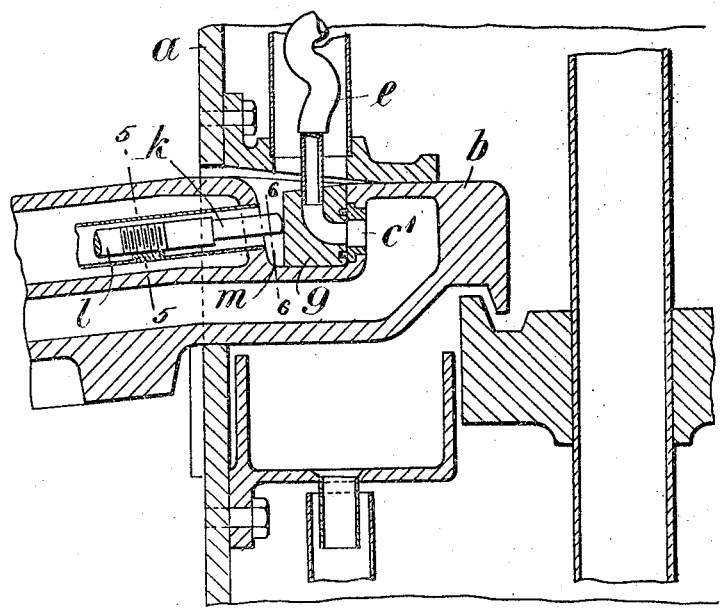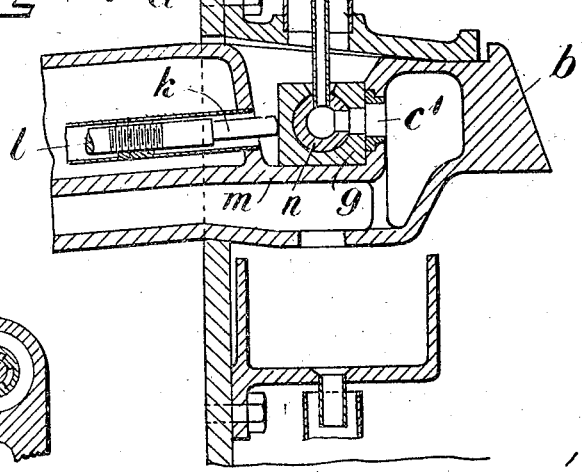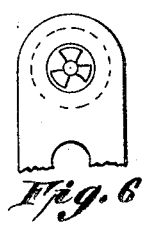

UNITED STATES PATENT OFFICE.

ARTHUR RAMÉN, OF HELSINGBORG, SWEDEN.

MECHANICAL FURNACE.

1,353,268.   Specification of Letters Patent.   Patented Sept. 21, 1920.

Application filed May 1, 1918. Serial No. 231,862.

*To all whom it may concern:*

Be it known that I, ARTHUR RAMÉN, a subject of the King of Sweden, residing at Helsingborg, Sweden, have invented new and useful Improvements in Mechanical Furnaces, of which the following is a specification.

The present invention has for its object means for conducting cooling water to the hollow stirring arms of mechanical roasting furnaces, which means permit the disengaging and change of the said arms without necessitating an interruption of the working of the furnace for more than a very short period of time and also without necessitating the use of a supporting shaft for the said arms of such a large diameter, that it permits the passage of a man for effecting the disengaging or change.

Such water cooled stirring arms hitherto usually have been arranged in such a manner that their inner ends are fitted to openings in the central shaft and connected to water supply pipes in the furnace, either permanently or detachably, the lower end of the pipes in the latter case being screwed into the corresponding arm. With such constructions, however, it is very difficult to obtain a completely tight connection between the cooling pipe and the arm, which connection can be loosened or tightened from the outside of the furnace, because it is of course very difficult and requires a very long time to screw a pipe tightly in an arm without any packing, especially if the tube is of a great length and screwed from its outer end.

According to the present invention the inner ends of the cooling pipes, through which the cooling liquid is conducted to the arms from a water tank or a water tube situated outside the furnace are shaped or arranged in such a manner, that they can be tightly pressed against the corresponding arms in the same manner as a valve is tightened against its seat. For this purpose the lower end of the pipes is either shaped as a tightening body in relation to the corresponding inlet opening in the stirring arm, so that the cooling liquid can not leak out this way, when the pipe is tightly pressed against the seat, formed by the edge of the said opening, or the said end of the pipe is connected to a tightening body acting in the same manner against the wall of the inlet opening. In this manner the two passages for the cooling liquid obviously may be tightly connected by the tightening body, formed on or connected to the one passage member and pressed against the seat formed in the other. The tightening may be accomplished either by moving the water supply pipe itself or any member, situated in the hollow shaft of the furnace or in the stirring arm and capable of being adjusted from without either through the end of the shaft or (in the latter case) through openings in the furnace. Instead of connecting the water supply pipes to the tightening body as hereinbefore described, the construction may be such that the said body is free from the supply pipe and the latter may be pressed against the tightening body when water is required to be supplied to the arms.

If the cooling pipe is arranged in the manner described above, it can obviously be brought into a tight connection with the arm without screwing, whereby the inconveniences above stated are obviated.

In the accompanying drawing some forms of the invention are illustrated. Figure 1 is a vertical section of the interior end of a hollow stirring arm and the adjacent parts of the furnace shaft according to the simplest form of the invention; Figs. 2 and 3 illustrate such sections of two other forms; Fig. 4 a section of a modification of the tightening body; and Figs. 5 and 6 are transverse sectional views taken respectively on the lines 5—5 and 6—6 of Fig. 3.

In Fig. 1 $a$ is the central furnace shaft or pillar shaft, provided with openings in which the interior ends of the stirring arms $b$ are inserted. On the upper side of one of the circulation channels of these arms, an opening $c$ is provided, which is surrounded by a seat, against which may be tightly pressed the correspondingly shaped end $d$ of a water supply pipe $e$, passing through the pillar shaft. This pipe is movable longitudinally, so that the tightening end, when desired, can be pressed against its seat and the cooling water thus can be introduced from the pipe to the arm, in which it circulates in the known manner and from which it is later let off. If the arm is broken or if an inspection of it is required the water supply is shut off and the pipe $e$ is raised, whereby the arm can be taken away and changed, without necessitating any interruption of the working of the furnace for more than a very short time.

In the form, illustrated in Fig. 2, the supply pipe $e$ is connected to a hollow tightening body $g$ at the inner end of the stirring arm, the said body being free from the stirring arm and provided with a passage or channel $f$. The tube $e'$ surrounding the pipe $e$ is sufficiently wide to permit the passage therethrough of the tightening body and thus serves as a guide for the tightening body when it is brought to its place.

In one circulation channel of the stirring arm there is arranged an opening or port $c^1$ against which the tightening body can be pressed, so that the outlet of the channel $f$ can be brought into a tight connection with the circulation channel. The means for effecting this pressing may for instance consist of an eccentric $h$ or a wedge $i$ (or, as in the illustrated example, of both), which is operated by a lever from the end of the pillar shaft of the furnace.

According to the form illustrated in Fig. 3 there is arranged in the inner end of each stirring arm, preferably at its upper side, a chamber or pocket $m$ communicating with the circulation channel of the arm by a port $c^1$. The hollow tightening body $g$ is situated in this pocket and firmly connected to the water supply pipe $e$. The means by which the tightening body is pressed against this port $c^1$ consists, as shown, of a bolt $k$ placed in the wall between the pocket and the interior of the stirring arm, which bolt by means of a key $l$ (preferably screw threaded) can be moved inward more or less, thereby pressing the body tightly against the seat around the port $c^1$, so that the water passing through the pipe $e$ can be introduced in the stirring arm when the tightening body is brought into a suitable position by means of the bolt $k$. For permitting the necessary movement of the body the pipe $e$ must be flexible, for which purpose it can be made in several bends, as illustrated.

As shown in Fig. 4 the tightening body can be provided with an inner lining $n$ connected to the supply pipe $e$ and around which the hollow tightening body on being pressed against its seat can turn into a position, suitable for the communication with the interior of the stirring arm, so that the strain upon the pipe does not become too great. This lining of course is provided with a water passage corresponding to that in the tightening body. On account of this construction the lower end of the pipe $e$ is not subjected to any great amount of strain and the bends shown in Fig. 3 may be omitted on account of the movability of the tightening piece on the lining.

Having now particularly described the nature of my invention and the manner of its operation, what I claim is:

1. A stirring device for a mechanical roasting furnace, comprising a hollow shaft and stirring arms, a circulation channel, and a detachable water supply pipe for each arm, said pipe at its outlet end having a tightening body, a correspondingly formed seat surrounding the water inlet of the circulation channel of the arm against which said body is adapted to be tightly pressed and means capable of being manipulated outside the shaft of the furnace for pressing said body against said seat.

2. A stirring device for a mechanical roasting furnace, comprising a hollow shaft and stirring arms, a circulation channel, and a detachable water supply pipe for each arm, said pipe at its outlet end having a tightening body, a correspondingly formed seat surrounding the water inlet of the circulation channel of the arm and against which said body is adapted to be tightly pressed, means located inside the shaft of the furnace for pressing said body against said seat, and means operable from outside the shaft for operating said first means.

3. A stirring device for a mechanical roasting furnace, comprising a hollow shaft and stirring arms, a circulation channel, and a detachable water supply pipe for each arm, said pipe being provided with a tightening body having a channel formed therein, a seat surrounding the water inlet of the circulation channel of the arm and against which said tightening body is adapted to be tightly pressed whereby its channel is brought into alinement with said circulation channel, and means operable from outside the shaft of the furnace for pressing said body against said seat.

4. A stirring device for a mechanical roasting furnace, comprising a hollow shaft and stirring arms, a circulation channel, and a detachable water supply pipe for each arm, said pipe being provided with a tightening body having a channel formed therein, a seat surrounding the water inlet of the circulation channel of the arm and against which said tightening body is adapted to be tightly pressed and means located inside the shaft of the furnace for pressing said body against said seat, and means operable from outside the shaft for operating said first means.

5. A stirring device for a mechanical roasting furnace, comprising a hollow shaft and stirring arms, a circulation channel, a detachable water supply pipe for each arm, said pipe being provided with a tightening body having a channel formed therein, a seat surrounding the water inlet of the circulation channel of the arm and against which said tightening body is adapted to be tightly pressed with its channel in alinement with said circulation channel, and means located inside the stirring arm for pressing said body against said seat.

6. A stirring device for a mechanical roasting furnace, comprising a hollow shaft and stirring arms, a circulation channel, and a detachable water supply pipe for each arm said pipe being provided with a tightening body having a channel formed therein, a seat surrounding the water inlet of the circulation channel of the arm and against which said tightening body is adapted to be tightly pressed with its channel in alinement with said circulation channel, an inner lining connected to and communicating with the water-supply pipe and on which said tightening body is movable said lining also communicating with the outlet opening of the tightening body.

In testimony whereof I have signed my name to this specification.

ARTHUR RAMÉN.

Witnesses:
 ERNST BÖRJESSON,
 T. F. RASMUSSEN.